N. DAROIS.
PORTABLE SNOW SCRAPER FOR TROLLEY CARS.
APPLICATION FILED DEC. 23, 1914.
1,142,677.
Patented June 8, 1915.
2 SHEETS—SHEET 1.
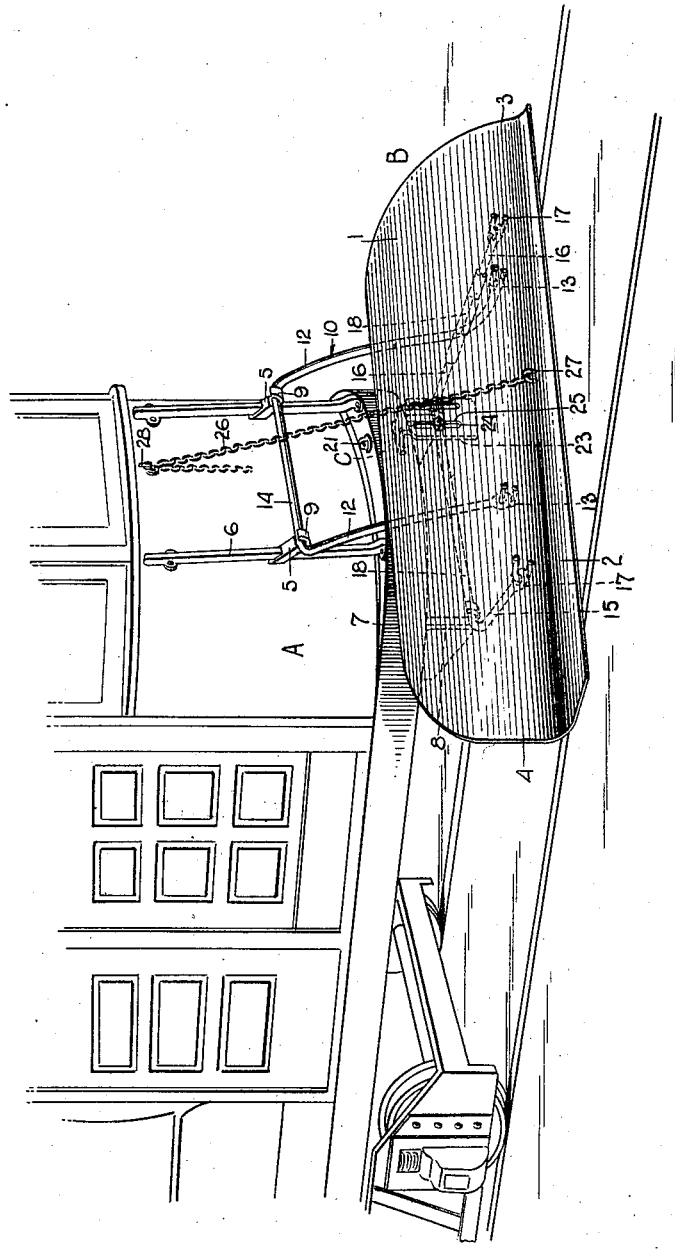
WITNESSES
INVENTOR
Noah Darois
BY
ATTORNEYS N. DAROIS.
PORTABLE SNOW SCRAPER FOR TROLLEY CARS.
APPLICATION FILED DEC. 23, 1914.
1,142,677.
Patented June 8, 1915.
2 SHEETS—SHEET 2.
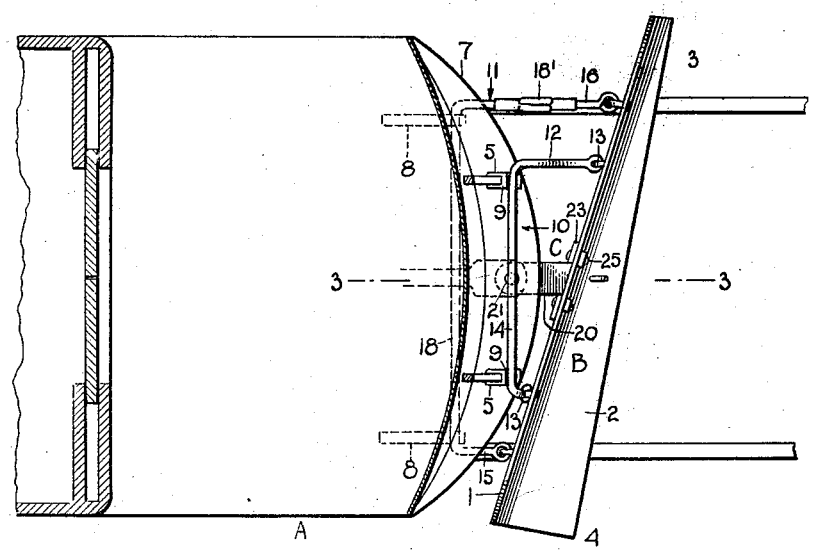
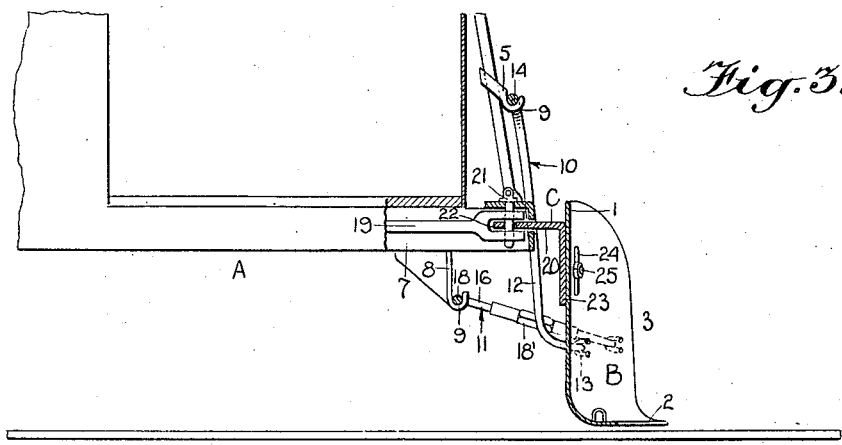
WITNESSES
INVENTOR
Noah Darois
BY
ATTORNEYS

UNITED STATES PATENT OFFICE.

NOAH DAROIS, OF NEW YORK, N. Y.

PORTABLE SNOW-SCRAPER FOR TROLLEY-CARS.

1,142,677.   Specification of Letters Patent.   Patented June 8, 1915.

Application filed December 23, 1914. Serial No. 878,746.

*To all whom it may concern:*

Be it known that I, NOAH DAROIS, a citizen of the United States, and a resident of the city of New York, borough of Brooklyn, in the county of Kings and State of New York, have invented a new and Improved Portable Snow-Scraper for Trolley-Cars, of which the following is a full, clear, and exact description.
This invention relates to snow scrapers especially designed for clearing street car tracks, and has to deal especially with a scraper which is adapted to be applied to the front of a trolley car to take the place of the fender and thereby scrape the snow off the tracks and discharge it to the right side, which is especially advantageous in a double track system.

The invention has for its general objects to provide a comparatively simple, inexpensive and substantial scraper for trolley cars which is so designed that it can be securely held in position and yet is easily detachable so that it can be changed from one end of the car to the other, and the scraper is equipped with connecting means or brackets whereby the same supports that hold the fender of the trolley car can be employed to support the scraper, it being necessary, however, to remove the fender for the substitution of the scraper.

A further object of the invention is to provide a scraper of novel form which extends obliquely from one rail to the other of the track, and the shape of the scraper is such that the snow is deflected and thrown out a considerable distance to the right of the track for providing the necessary clearance for the car body and steps.
With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a perspective view of the snow scraper applied to the front of a trolley car; Fig. 2 is a plan view of the scraper applied; and Fig. 3 is a vertical section on the line 3—3, Fig. 2.

Referring to the drawing, A designates the front portion of a trolley car, and B is the snow scraper applied thereto for scraping snow from the track. This scraper comprises a body made of flat metal of suitable gage and has a vertical portion 1 and a forwardly curved horizontal flange 2 which increases in width from the leading end 3 of the scraper or blade to the following end 4. The scraper is disposed at an angle to the track and extends from one side thereof to the other with the ends of the scraper projecting beyond the track rails far enough to clear a way sufficiently wide for the car body and its steps. By reason of this angular disposition of the scraper and the curved flange 2 thereof the snow is shot outwardly and upwardly from the rear end 4 of the scraper as the trolley car travels, thereby effectively clearing the tracks of snow.

The means for supporting the scraper on the trolley car may be of any desired character, but in the present instance the attaching means have been especially designed with reference to the fender supports, so that by removing the fender from the car the scraper can be substituted. The front of the car is provided with brackets 5 arranged on vertical supports 6 and disposed a suitable distance above the platform 7, and on the bottom of the platform are hangers or brackets 8. These and the brackets 5 have recesses or seats formed by hooks 9, whereby the attaching frames or braces 10 and 11 of the scraper B can be attached to the brackets 5 and 8. The brace 10 is approximately vertical and comprises a rod bent into an inverted U-shaped structure with the lower ends of its side members 12 hingedly connected at 13 with the rear of the scraper, and the horizontal connecting member 14 seated in the hooks 9 of the brackets 5. The brace 11 is approximately horizontal and is also a U-shaped structure having side members 15 and 16 hingedly connected at 17 with the rear side of the scraper and united by a transverse connecting portion 18 which is seated in the hooks 9 of the brackets 8. The side member 16 is longer than the side member 15 of this lower brace and is provided with a turn buckle 18' whereby the annular set of the scraper may be adjusted.

To rigidly hold the scraper in place an attaching device C is fastened to the middle thereof so as to connect with the draw-bar 19 in the platform 7. This attaching device C has a rearwardly extending horizontal member 20 which is connected with the draw-bar by a coupling pin 21 which passes through an opening 22 in the member 20 of the attaching device C, and also has a vertical member 23 disposed in contact with the rear side of the scraper, and the scraper has vertical slots 24 for receiving the bolts 25 which connect the attaching device C to the scraper. If desired a chain or equivalent means 26 may assist in supporting the weight of the scraper and withstand strains placed thereon, this chain having its lower end fastened to the scraper at 27 and the upper end fastened to a hook 28 on the dash of the trolley car. In order to remove the scraper the coupling pin 21 is taken out and the chain 26 detached from the hook 28, and then the upper and lower braces 10 and 11 can be unhooked from the brackets 5 and 8.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. The combination of a car including a platform, a pair of brackets above the platform, a pair of brackets below the platform, and a draw bar on the platform, with a snow scraper extending entirely across the car front, a bracing element attached to the rear of the scraper and removably engaged with the upper brackets, a bracing element connected with the rear of the scraper and detachably engaged with the lower brackets, and means for detachably securing the scraper to the draw bar.

2. The combination with a car having a plurality of fender supports, of a snow scraper extending across the front of the car, and a plurality of bracing elements permanently attached to the scraper and detachably engaged with the said devices of the car, whereby the snow scraper can be substituted for the fender.

3. The combination with a car having a draw-bar and fender supports, of a snow scraper disposed in front of the car, a plurality of braces connecting the scraper with the said devices, and means for fastening the scraper to the said draw-bar.

4. The combination of a car, a plurality of upper and lower brackets mounted thereon and having hooks, with a snow scraper, U-shaped brackets hingedly connected to the rear of the scraper and engaging in the hooks of the brackets, and a device rigidly secured to the rear of the scraper and detachably connected with the platform of the car.

In testimony whereof I have signed my name to this specification in the presence of two subscribing witnesses.

NOAH DAROIS.

Witnesses:
AUGUST W. SCHMIDT,
HENRY W. DREYER.

Copies of this patent may be obtained for five cents each, by addressing the "Commissioner of Patents, Washington, D. C."